US011412732B2

(12) United States Patent
Wertz et al.

(10) Patent No.: US 11,412,732 B2
(45) Date of Patent: Aug. 16, 2022

(54) LIGHT-TRIGGERED SUSTAINED RELEASE OF PESTICIDES

(71) Applicant: International Business Machines Corporation, Armonk, NY (US)

(72) Inventors: Jason T. Wertz, Pleasant Valley, NY (US); Brandon M. Kobilka, Tucson, AZ (US); Jacob T. Porter, Highland, NY (US); Joseph Kuczynski, North Port, FL (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 15/982,409

(22) Filed: May 17, 2018

(65) Prior Publication Data
US 2019/0350194 A1 Nov. 21, 2019

(51) Int. Cl.
*A01N 25/00* (2006.01)
*A01N 25/34* (2006.01)

(52) U.S. Cl.
CPC ............ *A01N 25/00* (2013.01); *A01N 25/34* (2013.01)

(58) Field of Classification Search
CPC ................................. A01N 25/00; A01N 25/34
See application file for complete search history.

(56) References Cited

U.S. PATENT DOCUMENTS

| 5,229,122 | A * | 7/1993 | Chadwick | A01N 25/28 424/408 |
|---|---|---|---|---|
| 9,878,039 | B1 * | 1/2018 | King | A61K 8/062 |
| 2006/0275335 | A1 * | 12/2006 | McKernan | A01N 25/34 424/405 |
| 2009/0252811 | A1 * | 10/2009 | Lin | A61P 43/00 424/501 |
| 2013/0196851 | A1 | 8/2013 | Parrish et al. | |
| 2014/0249031 | A1 | 9/2014 | Mulqueen et al. | |
| 2015/0072862 | A1 * | 3/2015 | Dujardin | A01N 47/36 504/215 |
| 2015/0140056 | A1 * | 5/2015 | Man | A01N 41/02 424/421 |
| 2015/0274885 | A1 * | 10/2015 | Joy | A01N 25/34 504/359 |
| 2015/0366190 | A1 | 12/2015 | Lipinsky et al. | |

FOREIGN PATENT DOCUMENTS

WO WO-9000005 A1 * 1/1990 ............ A01N 25/26

OTHER PUBLICATIONS

M. Lehmann et al., "Supramolecular order of stilbenoid dendrons: importance of weak interactions," J. Mater. Chem., 2006, 16, pp. 441-451.*
Azagarsamy et al., "A Coumarin-based Photodegradable Hydrogel: Design, Synthesis, Gelation, and Degradation Kinetics," Uploaded to ResearchGate by Daniel Mckinnon on Jul. 18, 2014, pp. 1-9.
Gadwa, S., "Table of Properties of Pesticides Used in Residential Areas," Mar. 26, 2002, pp. 1-12, Rema Ecological Services, LLC. http://www.qrwa.org/images/customer-files//pesticide_table.pdf.
Mueller, D., "Fungicides: Terminology," Integrated Crop Management News, 1250, May 15, 2006, Iowa State University, 4 pages. http://lib.dr.iastate.edu/cropnews/1250.
Mueller, D., "Fungicides: Others," Integrated Crop Management News, 1296, Jun. 5, 2006, Iowa State University, 3 pages. https://lib.dr.iastate.edu/cropnews/1296/.
"Tackle fungal forces to save crops, forests and endangered animals, say scientists," Apr. 12, 2012, Imperial College London, pp. 1-3. http://www.imperial.ac.uk/news/108986/tackle-fungal-forces-save-crops-forests/.
Lai et al., "A Mesoporous Silica Nanosphere-Based Carrier System with Chemically Removable CdS Nanoparticle Caps for Stimuli-Responsive Controlled Release of Neurotransmitters and Drug Molecules," Journal of the American Chemical Society, 2003, 125(15), pp. 4451-4459.

* cited by examiner

Primary Examiner — Monica A Shin
(74) Attorney, Agent, or Firm — Kelsey M. Skodje

(57) ABSTRACT

A process of forming a sustained-release pesticide coating, a process of forming a sustained-release pesticide capsule, and a sustained-release pesticide coating are disclosed. The process of forming the sustained-release pesticide coating includes depositing a first layer that includes a first pesticide onto a surface, and depositing a second layer that includes a photodegradable material onto the first layer. The process of forming the sustained-release pesticide coating also includes depositing a third layer that includes a second pesticide onto the second layer. The process of forming the sustained release pesticide capsule includes selecting a pesticide, selecting a photosensitive compound, and encapsulating the pesticide in a photosensitive capsule that includes a polymer formed from the photosensitive compound. The sustained-release pesticide coating includes a pesticide and a material having a photosensitive component. The material is in contact with the pesticide, and temporarily prevents the pesticide from contacting a surface.

13 Claims, 7 Drawing Sheets

R =

230 or

240

LIGHT-TRIGGERED SUSTAINED RELEASE OF PESTICIDES

BACKGROUND

The present disclosure relates to photodegradable materials and, more specifically, to photodegradable materials for pesticide distribution.

Photodegradable materials are materials that decompose when exposed to light. This decomposition can be reversible. Photodegradable materials include materials made, at least in part, from photosensitive molecular compounds (e.g., dimers, oligomers, and polymers that react with ultraviolet (UV) light). Examples of photodegradable materials that can be made from these compounds include plastics, fibers, paints, etc. In some instances, photodegradable materials can offer protection from UV light. For example, a material can be sprayed with a coating made that includes a photosensitive polymer. This polymer reacts with UV light, preventing the light from damaging the material under the coating. Other types of UV light protective materials can reflect UV light in order to prevent photodegradation of an underlying material.

SUMMARY

Various embodiments of the present disclosure are directed to a process of forming a pesticide coating. This process can include depositing a first layer onto a surface, wherein the first layer includes a first pesticide. The process can also include depositing a second layer onto the first layer, wherein the second layer includes a photodegradable material, such as a coumarin-based hydrogel. Further, the process can include depositing a third layer onto the second layer, wherein the third layer includes a second pesticide. The first pesticide and the second pesticide can be independently selected from a group consisting of a fungicide, an herbicide, an insecticide, a nematicide, a molluscicide, a piscicide, an avicide, a rodenticide, a bactericide, insect repellent, an animal repellent, and a disinfectant. Further, at least one of the first layer and the second layer can include at least one additional material, such as an additional pesticide, a binder, a carrier fluid, or an additive.

Additional embodiments of the present disclosure are directed to a process of forming a sustained-release pesticide capsule. This process can include selecting a pesticide, selecting a photosensitive compound (e.g., a stilbenoid compound or a functionalized resveratrol dimer), and encapsulating the pesticide in a photosensitive capsule. Encapsulating the pesticide in the photosensitive capsule can involve forming a porous particle, capping pores in the porous particle with a photosensitive polymer formed from a stilbenoid compound, opening the pores by a photochemical reaction, filling the open pores with the pesticide, and allowing the pores to close in the absence of actinic radiation. However, encapsulating the pesticide can alternately include adding an emulsifying agent to a mixture containing a functionalized resveratrol dimer and the pesticide, adding a curing agent to the mixture, and forming a photodegradable shell around the pesticide in the absence of actinic radiation. An additive (e.g., a colorant, a corrosion inhibitor, a stabilizer, a hardener, a co-solvent, and a plasticizer) can also be encapsulated in the photosensitive capsule. The process can also include incorporating the capsule into a polymer matrix.

Further embodiments of the present disclosure are directed to a sustained-release pesticide coating. The coating can include at least one pesticide and a material in contact with the at least one pesticide. The material can include a photosensitive component. Additionally, the material can temporarily prevent contact between the at least one pesticide and a surface. The material can be a coumarin-based hydrogel, a photodegradable capsule, or a capsule having pores capped by a photosensitive polymer.

BRIEF DESCRIPTION OF THE DRAWINGS

FIG. 1 is a flow diagram illustrating a process of preparing a sustained-release pesticide coating, according to some embodiments of the present disclosure.

FIG. 2A is a chemical structure diagram illustrating molecular structures of sustained-release pesticide coating components, according to some embodiments of the present disclosure.

FIG. 2B is a chemical structure diagram illustrating a photodegradable coumarin-based hydrogel, according to some embodiments of the present disclosure.

FIG. 3 is a flow diagram illustrating a process of preparing sustained-release pesticide capsules, according to some embodiments of the present disclosure.

FIG. 4A is a chemical reaction diagram illustrating a process of forming photodegradable sustained-release pesticide capsules, according to some embodiments of the present disclosure.

FIG. 4B is a chemical reaction diagram illustrating processes of forming and decomposing photodegradable capsules, according to some embodiments of the present disclosure.

FIG. 5 is a chemical reaction diagram illustrating a process of forming porous sustained-release pesticide capsules, according to some embodiments of the present disclosure.

DETAILED DESCRIPTION

Current agricultural techniques rely on pesticides to protect crops that provide food for human and animal consumption, as well as raw materials for applications such as textiles, lumber, and pharmaceuticals. A pesticide is any substance or mixture of substances intended to protect against pests (e.g., organisms that may interfere with crop growth). The term pesticide can refer to fungicides, herbicides, insecticides, nematicides, molluscicides, piscicides, avicides, rodenticides, bactericides, insect repellents, animal repellents, disinfectants, or combinations thereof. A wide array of pesticides has been developed in order to provide varying levels of cost, resistance to environmental factors (e.g., rain, sun, wind, air pollution, etc.), safety, targeted organism specificity, etc.

The pesticide chosen for a given application depends on a variety of factors. For example, the role of a pesticide in the protection of a selected plant is considered. Pesticides can offer preventative activity, early-infection activity, pest eradication, and/or anti-sporulant activity. The pesticide's mobility within a plant can also be considered. For example, contact pesticides remain on the surface of a plant, while systemic pesticides are absorbed into the plant tissue. Further, pesticides can be selected based on their mode of action and breadth of activity. The mode of action refers to how a pesticide acts on a target organism (e.g., by damaging cell membranes, inactivating specific enzymes, or interfering with metabolic processes), and the breadth of activity refers to the number of sites on which the pesticide acts. For example, some pesticides act against a single step in an organism's metabolic processes, while other pesticides act against more than one step in at least one metabolic process. Other considerations take the class of chemical compound of the pesticide into account. For example, a particular fungicide may not be chosen to act against a fungus when the fungicide is in a class of compounds that are toxic to a local crop or animal population.

It is advantageous to avoid depositing more pesticide than is necessary. Excess pesticides may harm the protected crop, as well as other organisms that are not the intended target. Further, over-application of pesticides is costly, wasteful, and time-consuming. However, a significant quantity of applied pesticides is lost or destroyed before the pesticides can be effective. For example, pesticides on a plant surface can be washed away by rain. Therefore, excess pesticides are often necessary in order to counteract this loss. In some instances, pesticide coatings are applied at regular intervals in order to replace those that are washed away, reacted with an organism, or absorbed by plants and soil. This requires a great deal of time, labor, and materials.

Processes and materials for sustained release of pesticides are disclosed herein. Sustained release of pesticides reduces the number of applications and overall quantity of pesticide needed because the pesticides are protected from the environment prior to release. Additionally, a free pesticide can be applied with a protect pesticide, and can act against the organism before the next pesticide is released. The pesticides are gradually released as a protective photosensitive material (e.g., a polymeric coating or capsule) reacts with actinic radiation. Actinic radiation is electromagnetic radiation capable of producing a photochemical reaction. Actinic radiation (e.g., UV light) can be provided by sunlight. However, artificial light is used in other embodiments, either in combination with sunlight or alone. For example, indoor farming or gardening techniques (e.g., hydroponics, aeroponics, and aquaponics) use artificial light (e.g., incandescent lamps, fluorescent lamps, or light-emitting diodes) to provide actinic radiation.

Figure 1:
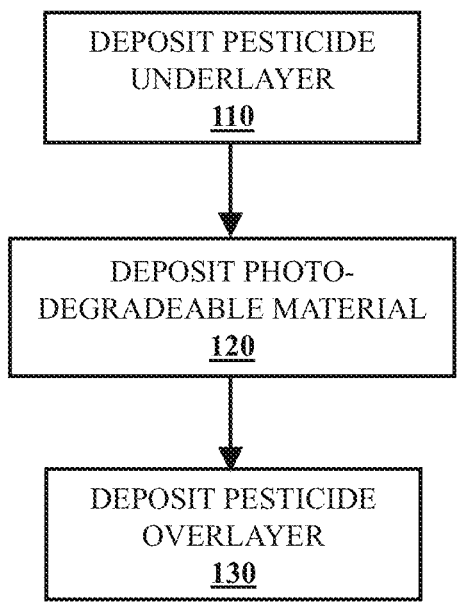

FIG. 1 is a flow diagram illustrating a process 100 of preparing a sustained-release pesticide coating, according to some embodiments of the present disclosure. In this example, the sustained-release pesticide coating is deposited onto the surface of crops or other plants. However, it should be noted that the sustained-release pesticide coating can be applied to other surfaces (e.g., surfaces of outdoor furniture, camping equipment, boating equipment, etc.) in some embodiments.

In process 100, a first layer of pesticide is applied to a plant surface. This is illustrated at step 110. The first layer of pesticide is referred to herein as the pesticide underlayer. Examples of techniques that can be used to apply the pesticide underlayer include spraying, dipping, curtain casting, and/or cascade casting. This underlayer includes at least one variety of pesticide. In some embodiments, the pesticide underlayer is directed to a single type of organism (e.g., a fungus). In other embodiments, the pesticide underlayer includes a combination of pesticides directed to more than one type of organism. The pesticide underlayer may also include materials (e.g., binders, additives, and carrier fluids) other than the selected pesticide or pesticides. This is discussed in greater detail below.

Examples of pesticides that can be used can include fungicides (e.g., azoxystrobin, azadirachtin, captan, chlorothalonil, copper sulfate, etridiazole, fenarimol, flutolanil, fosetyl-aluminum, iprodione, mancozeb, maneb, metalaxyl, myclobutanil, pentachloronitrobenzene (PCNB), propamocarb, propiconazole, streptomycin sulfate, sulfur, thiabendazole, thiophanate-methyl, triadimefon, triforine, vinclozolin, and/or ziram), insecticides (e.g., acephate, bendiocarb, bifenthrin, carbaryl, chlorpyrifos, cyfluthrin, cypermethrin, diazinon, dimethoate, esfenvalerate, fenbutatin oxide, hexythiazox, imidachloprid, lambda-cyhalothrin, malathion, permethrin, petroleum distillates, potassium salts of fatty acids, pymetrozine, pyrethrins, rotenone, spinosad, and trichlorfon), and herbicides (e.g., 2,4-dichlorophenoxyacetic acid, arsenic acid, benefin, bensulide, bentazon, clopyralid, corn gluten meal, dicamba salt, diquat dibromide salt, dithiopyr, S-ethyl-N,N-dipropylthiocarbamat (EPTC), fluazifop-p-butyl, glufosinate isopropylamine salt, halosulfuron, isoxaben, mecoprop, metolachlor, monosodium methanearsonate (MSMA), napropamide, oryzalin, oxadiazon, pelargonic acid, pendimethalin, prodiamine, siduron, simazine, triclopyramine, and/or trifluralin). However, any appropriate pesticide may be used, such as nematicides, molluscicides, piscicides, avicides, rodenticides, bactericides, insect repellents, animal repellents, or disinfectants.

A binder is added to the pesticide underlayer in some embodiments. Binders are polymer adhesives that aid in forming a pesticide coating on a surface. Examples of compounds that can be used as binders can include alginates, cellulose-based polymers (e.g., carboxymethylcellulose, cellulose acetate phthalate, hydroxymethyl cellulose, methyl cellulose, etc.), gelatin, natural gums (e.g., gum arabic, locust bean gum, carrageenan gum, xanthan gum, etc.), pectins, starch-based polymers (e.g., carboxymethylstarch), poly(acrylates) (e.g., poly(acrylic acid) and poly(methacrylic acid)), poly(ethers), poly(acrylamides), poly(vinyl alcohol), maleic anhydride copolymers, hydrolyzed acrylonitrile grafted starch, acrylic acid grafted starch, poly(N-vinyl pyrrolidine), poly(2-hydroxyethylacrylate), poly(2-hydroxyethyl-methacrylate), poly(sodium acrylate-co-acrylic acid), poly(vinyl sulfonates), poly(vinylsulfonic acid), poly (ethylene oxide), block copolymers of ethylene oxide with polyamides, polyesters, or polyurethanes, and salt forms, mixtures, and/or copolymers thereof.

Further, the pesticide underlayer can include a carrier fluid. A carrier fluid is a liquid, such as an organic solvent or water, that allows coatings to flow and be applied via various methods (e.g., spraying, dipping, curtain casting, and/or cascade casting). A carrier fluid can be added to the pesticide underlayer in order to facilitate its application. Examples of organic solvents that may be used as carrier fluids include acetic acid, acetonitrile, acetone, butyl alcohol, dichloromethane, dimethylformamide, dimethylsulfoxide, 1,4-dioxane, ethanol, formic acid, isopropanol, methanol, n-propanol, tetrahydrofuran, and mixtures and/or aqueous solutions thereof. However, in some embodiments, the pesticide underlayer is applied to a surface without a carrier fluid.

Additives can optionally be included in the pesticide underlayer as well. Additives are compounds that contribute additional functionality to a material. Additives can be included in the pesticide underlayer in order to provide functions other than biocide activity, adhesion, or application facilitation. For example, colorants (e.g., pigments and/or fluorescent dyes) can be added. Colorants aid in indicating the extent of crop coverage. Other additives that may be used can include corrosion inhibitors, stabilizers, hardeners, co-solvents for increasing viscosity, and plasticizers for increasing the uniformity of the coating.

After application of the pesticide underlayer at step 110, a photodegradable material is deposited onto the pesticide underlayer. This is illustrated at step 120. The photodegradable material can be deposited by spraying it onto the pesticide underlayer in some embodiments. However, any appropriate application method can be used (e.g., dipping, curtain casting, or cascade casting). The photodegradable material is a coumarin-based hydrogel that decomposes when exposed to actinic radiation. A hydrogel is a cross-linked polymer network that retains a significant fraction of water within its structure, but does not dissolve in water. The structure and synthesis of coumarin-based hydrogels are discussed in greater detail with respect to FIGS. 2A and 2B. The coumarin-based hydrogels illustrated herein decompose when exposed to electromagnetic radiation having wavelengths ranging from approximately 250 nm-450 nm. However, electromagnetic radiation at other wavelengths (e.g., approximately 100 nm-500 nm) can also cause decomposition of these photodegradable materials.

Another layer of pesticide is then deposited onto the photodegradable layer. This is illustrated at step 130. This layer of pesticide is referred to herein as the pesticide overlayer. The pesticide overlayer includes at least one variety of pesticide. In some embodiments, the pesticide overlayer has the same composition as the pesticide underlayer. However, in other embodiments, the overlayer may include a different combination of pesticides, binders, additives, and/or carrier fluids than that of the underlayer. Examples of pesticides, binders, additives, and carrier fluids that can be included in the pesticide overlayer are discussed in greater detail with respect to the pesticide underlayer. The three layers applied in process 100 provide a sustained release pesticide coating. The pesticide underlayer immediately acts against targeted organisms (e.g., fungi, viruses, or bacteria) on the surface or interior of the plant. Then, as the photodegradable material decomposes, the plant surface is exposed to the pesticide overlayer.

Figure 2A:
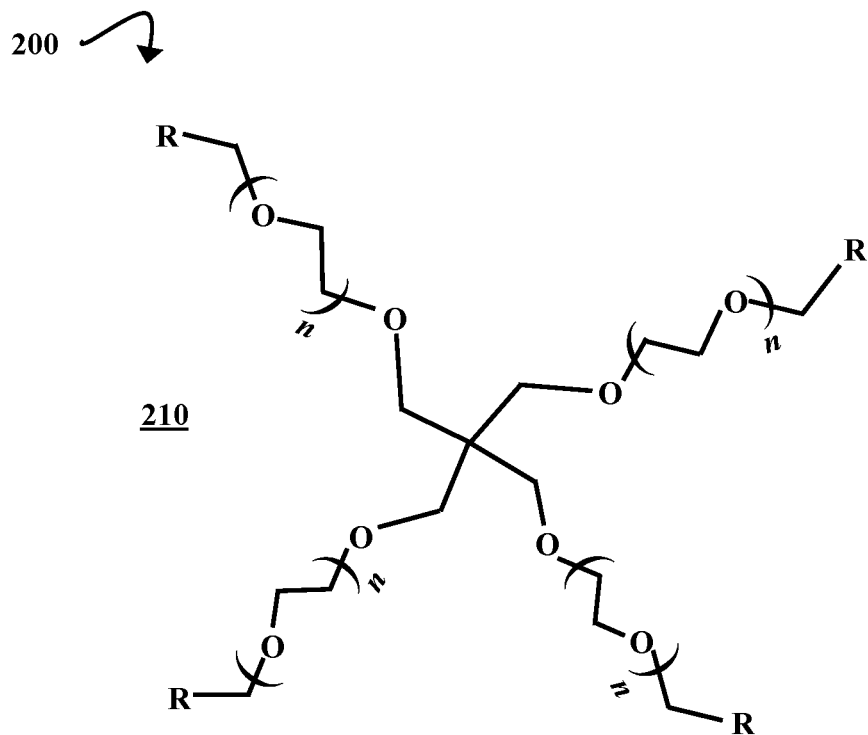
Figure 2A:
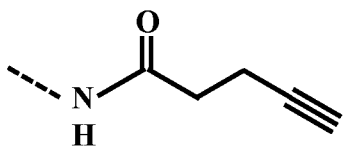
Figure 2A:
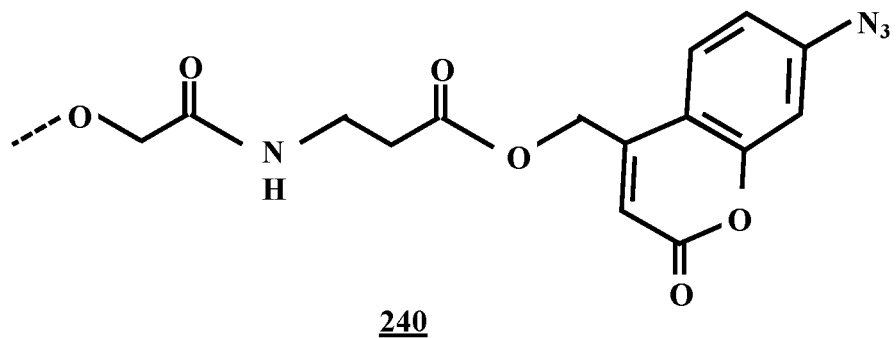

FIG. 2A is a chemical structure diagram 200 illustrating molecular structures of sustained-release pesticide coating components, according to some embodiments of the present disclosure. The illustrated pesticide coating components are units in a photodegradable coumarin-based hydrogel. The coumarin-based hydrogel units include 4-armed polyethylene glycol (PEG) compounds. An example 4-armed PEG compound 210 is represented by a generic structure that has R functional groups. The R groups on the 4-armed PEG compound 210 are either alkyne-terminated R groups 230 or coumarin azide-terminated R groups 240.

In an example synthesis (not shown) of a 4-armed PEG compound 210 with alkyne-terminated R groups 230, excess triethylamine is added to a dichloromethane (DCM) solution of a 4-armed PEG amine-HCl. A 4-armed PEG amine-HCl of any average molecular weight (e.g., in a range of approximately 300 Da-20,000 Da) can be selected. The molecular weight of each ethylene glycol repeat unit —OCH$_2$CH$_2$— is 44.05 Da. The DCM solution is stirred at room temperature (e.g., approximately 25° C.-30° C.). After the DCM solution has stirred at room temperature for approximately 15 minutes, excess 4-pentynoic acid, diisopropyl carbodiimide, and dimethyl aminopyridine are added to the solution at ice bath temperature (e.g., approximately 10° C.-15° C.). This mixture is then warmed to room temperature, and stirred for approximately twenty-four hours. After this period of stirring, the mixture is added dropwise to cold diethyl ether. The resulting precipitate is centrifuged, and the supernatant fluid is decanted. The precipitate is allowed to dry, and then dissolved in distilled water. This solution is dialyzed against a large volume of water (e.g., approximately two liters) for approximately twenty-four hours. The dialyzed solution is then lyophilized to obtain the 4-armed PEG compound 210 with alkyne-terminated R groups 230.

In an example synthesis (not shown) of a 4-armed PEG compound 210 with coumarin azide-terminated R groups 240, excess N,N-diisopropyl ethylamine (DIEA, Hunig's base) is added to a dichloromethane (DCM) solution of a 4-armed PEG tetra-carboxylic acid, followed by 1-[bis(dimethylamino)methylene]-1H-1,2,3-triazolo [4,5-b]pyridinium 3-oxidhexafluorophosphate (HATU). A 4-armed PEG tetracarboxylic acid of any appropriate average molecular weight (e.g., in a range of approximately 300 Da-20,000 Da) can be selected. A DCM solution of coumarin azide and DIEA are next added to the solution at ice bath temperature (e.g., approximately 10° C.-15° C.). The mixture warmed to room temperature, and stirred for approximately twenty-four hours before being added dropwise to cold diethyl ether. The resulting precipitate is centrifuged, and the supernatant fluid is decanted. The precipitate is allowed to dry, and then dissolved in distilled water. This solution is dialyzed against a large volume of water (e.g., approximately two liters) for approximately twenty-four hours. The dialyzed solution is then lyophilized to obtain the 4-armed PEG compound 210 with coumarin azide-terminated R groups 240.

Figure 2B:
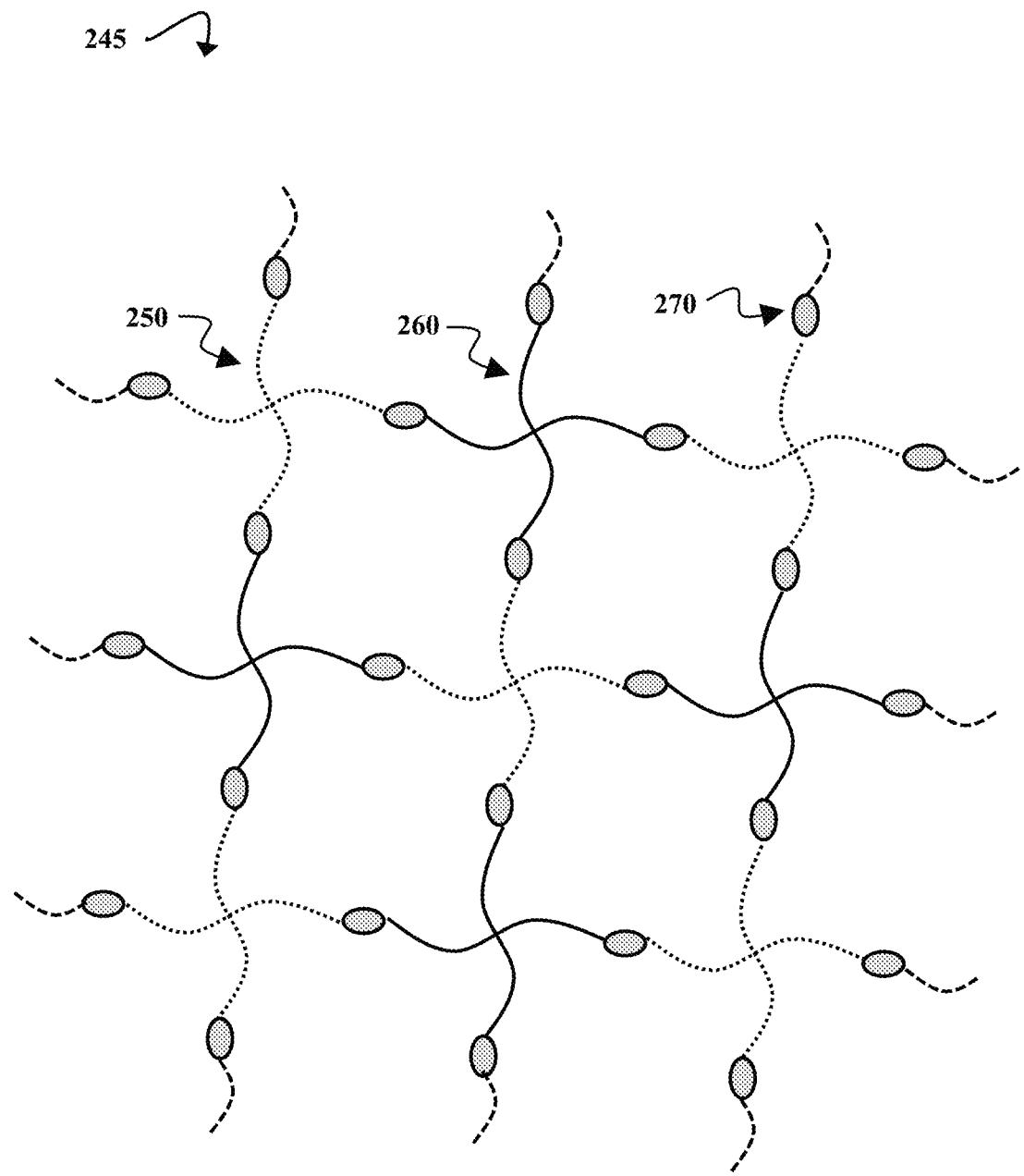

FIG. 2B is a chemical structure diagram illustrating a photodegradable coumarin-based hydrogel 245, according to some embodiments of the present disclosure. This hydrogel 245 is an example of a hydrogel that can be applied as a photodegradable layer at step 130 of process 100, which is illustrated in FIG. 1. The coumarin-based hydrogel 245 can be formed in a copper(I)-catalyzed azide-alkyne cycloaddition reaction between the 4-armed PEG compound 210 with coumarin azide-terminated R groups 240 and the 4-armed PEG compound 210 with alkyne-terminated R groups 230. However, in some embodiments, the hydrogel 245 is formed in a strain-promoted azide-alkyne cycloaddition reaction between the aforementioned types of 4-armed compound 210. The hydrogel 245 has alternating PEG units 250 (dotted lines) and 260 (bold lines) provided by the 4-armed PEG compounds 210, which are linked by photodegradable coumarin units 270 (gray ovals). The dashed lines at the edges of the hydrogel 245 structure represent additional PEG units outside of the portion of the hydrogel 245 illustrated in FIG. 2B. It should be noted that, although FIG. 2B illustrates a two-dimensional (2D) portion of the hydrogel, coumarin-based hydrogels are three-dimensional (3D).

Figure 3:
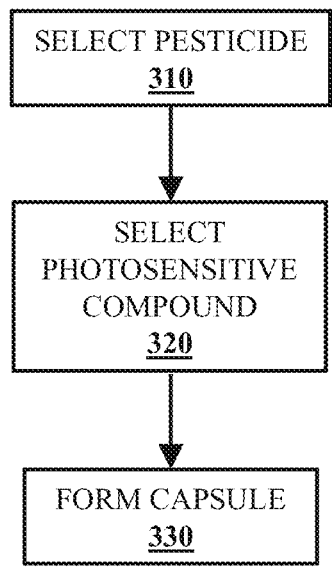

FIG. 3 is a flow diagram illustrating a process 300 of preparing sustained-release pesticide capsules, according to some embodiments of the present disclosure. This type of capsule includes a photodegradable capsule material that encloses a pesticide payload. Capsules of any appropriate size can be formed (e.g. approximately 10 nm-1000 μm in diameter). For example, the capsules can be microcapsules ranging from approximately 10 μm-1000 μm in diameter. In some embodiments, the capsules are nanocapsules ranging from approximately 10 nm-1000 nm in diameter. Herein, "capsule" can refer to either a microcapsule or a nanocapsule, unless otherwise specified.

Process 300 begins with the selection of a pesticide for the capsule payload. This is illustrated at step 310. Examples of pesticides that can be selected include fungicides, insecticides, and herbicides. Examples of fungicides, insecticides, and herbicides that can be used are discussed in greater detail with respect to FIG. 1. It is noted that other pesticides can be used in some embodiments, such as nematicides, molluscicides, piscicides, avicides, rodenticides, bactericides, insect repellents, animal repellents, disinfectants. Additionally, the payload can include more than one type of pesticide. Additives can be included in the payload as well (e.g., stabilizers, solvents, viscosity modifiers, odorants, colorants, blowing agents, antioxidants, curing agents, etc.).

A photosensitive compound is then selected. This is illustrated at step 320. In some embodiments, the photosensitive compound is a resveratrol dimer that undergoes retro-dimerization when exposed to actinic radiation. The resveratrol dimer can be functionalized, and reacts to form a photodegradable polymeric shell. This is discussed in greater detail with respect to FIGS. 4A and 4B. In other embodiments, the photosensitive compound a stilbenoid compound, which forms a photosensitive polymer. This is discussed in greater detail with respect to FIG. 5. It should be noted that the selection of the pesticide at step 310 is illustrated as occurring after the selection of the photo-cleavable polymer at step 320. However, in some embodiments, step 310 can occur before step 320. Further, steps 310 and 320 can occur simultaneously in some embodiments.

Figure 4A:
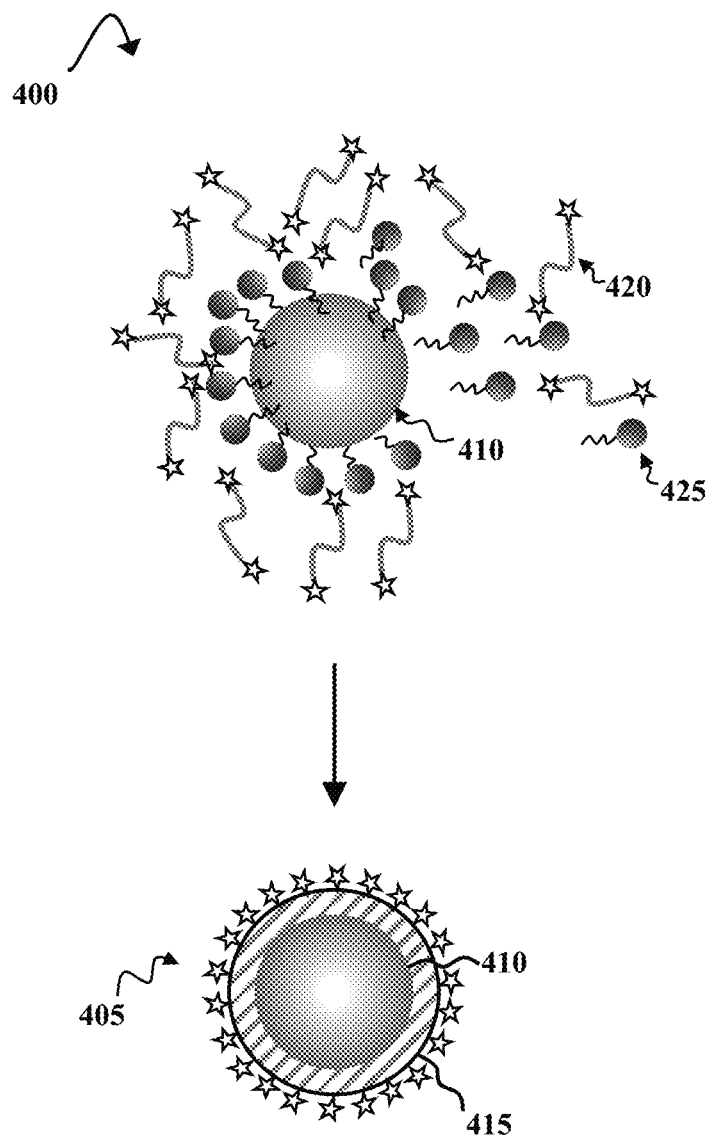

The selected pesticide and photosensitive compound are used to form sustained-release pesticide capsules. This is illustrated at step 330. The photosensitive compounds are used in the encapsulation of the pesticide and any other payload components. For example, the pesticide can be contained inside of a photodegradable capsule, or inside of capped pores in a porous capsule. When the capsules are exposed to actinic radiation, the pesticide and other payload components are released. The release occurs because of a photochemical reaction that leads to either capsule shell decomposition or pore opening. The type of release depends upon the type of capsule (e.g., a photodegradable capsule or a porous capsule). The capsules are deposited as pesticide coatings. In some embodiments, these coatings include additional materials (e.g., polymer matrices, carrier fluids, and/or additives). Techniques for applying pesticide coatings can include spraying, dipping, curtain casting, and/or cascade casting.

In some embodiments, the capsules have orthogonal functionalities provided by surface functional groups. This functionality can be provided by functional groups on compounds used to form the capsules, or by functional groups added by surface modification of the capsules. Orthogonal functionalities can facilitate incorporation of capsules into a polymer matrix by enabling binding of the polymer to the capsule surface. Further, orthogonal functionalities can enable binding of additives to the capsules. However, it should be noted that, in some embodiments, the capsules have no surface functional groups that can act as orthogonal functionalities. Capsules without surface functional groups, or with surface-bound additives, can be incorporated into polymer matrices by blending.

Examples of polymer matrices into which the capsules can be incorporated can include alginates, cellulose-based polymers (e.g., carboxymethylcellulose, cellulose acetate phthalate, hydroxymethyl cellulose, methyl cellulose, etc.), gelatin, natural gums (e.g., gum arabic, locust bean gum, carrageenan gum, xanthan gum, etc.), pectins, starch-based polymers (e.g., carboxymethylstarch), poly(acrylates) (e.g., poly(acrylic acid) and poly(methacrylic acid)), poly(ethers), poly(acrylamides), poly(vinyl alcohol), maleic anhydride copolymers, hydrolyzed acrylonitrile grafted starch, acrylic acid grafted starch, poly(N-vinyl pyrrolidine), poly(2-hydroxyethylacrylate), poly(2-hydroxyethyl-methacrylate), poly(sodium acrylate-co-acrylic acid), poly(vinyl sulfonates), poly(vinylsulfonic acid), poly(ethylene oxide), block copolymers of ethylene oxide with polyamides, polyesters, polyurethanes, and salt forms, mixtures, and/or copolymers thereof.

As discussed above, additives can be bound to orthogonal functionalities on the capsules. However, additives can also be incorporated into polymer matrices containing the capsules, and/or mixed with carrier fluids containing the capsules. These additives may include colorants, corrosion inhibitors, stabilizers, hardeners, viscosity modifiers, plasticizers, etc. Additionally, the sustained-release pesticide capsules can be combined with an un-encapsulated pesticide (e.g., in the polymer matrix or carrier fluid). The pesticide that is not encapsulated immediately acts against a targeted organism. Then, when the capsules are exposed to actinic radiation, the plant surface is gradually exposed to the released pesticide payload.

FIG. 4A is a chemical reaction diagram illustrating a process 400 of forming photodegradable sustained-release pesticide capsules, according to some embodiments of the present disclosure. These photodegradable capsules provide a first example of pesticide capsules that can be used in process 300, which is illustrated in FIG. 3. The illustrated photodegradable capsule 405 includes a payload droplet 410 containing pesticide surrounded by a photodegradable shell 415. The shell 415 is illustrated as having orthogonal functionalities, which are represented by stars. The orthogonal functionalities can bind to additives (e.g., additional pesticides) and/or a polymer matrix. However, in some embodiments the shell 415 is not functionalized. Though FIG. 4A illustrates a cross-sectional view of the photodegradable shell 415, it should be understood that the shell 415 completely encapsulates the payload 410.

In process 400, the functionalized resveratrol dimers 420 are added to a stirring aqueous solution containing an ethylene maleic anhydride (EMA) surfactant, urea, and ammonium chloride ($NH_4Cl$). The functionalized resveratrol dimers 420 are illustrated as gray curved lines having stars at each end, which represent functional groups (e.g., allyl, vinyl, meth(acrylate), or epoxy groups) that will provide orthogonal functionality to the photodegradable capsule 405. However, it should be noted that, in other embodiments, the dimers 420 may each have only one of these functional groups, or may have none. In these instances, a photodegradable capsule without orthogonal functionalities can be formed. The pH of the aqueous solution containing the functionalized resveratrol dimers 420 is adjusted to approximately 3.5 by adding acid and base (e.g., hydrochloric acid (HCl) and sodium hydroxide (NaOH)). The payload 410 is dispersed in the aqueous phase. The payload 410 includes at least one type of pesticide. Further, the payload 410 can optionally include additional payload components. Examples of payload components that may be included are discussed in greater detail with respect to FIG. 3.

An emulsifying agent 425 is added to the mixture as it continues stirring. The emulsifying agent 425 is an appropriate oil-in-water emulsifier (e.g. an emulsifier selected from emulsifiers having hydrophilic-lipophilic balance (HLB) values greater than 8). Examples of emulsifiers such as these include polysorbate 60, polysorbate 80, sorbitan laurate, cetearyl glucoside, oleth-10, oleth-20, PEG-7 olivate, PEG-8 oleate, PEG-8 laurate, PEG-20 almond glycerides, PEG-60 almond glycerides, etc. In FIG. 4A, molecules of the emulsifying agent 425 are represented by black wavy lines, which each have a gray sphere at one end. The black wavy lines represent the hydrophobic regions of the molecules of emulsifying agent 425, and the gray spheres represent the hydrophilic regions.

A curing agent is added to the mixture in order to complete the reaction between the functionalized resveratrol dimers 420 and the emulsifying agent 425. In some embodiments, the curing agent is formaldehyde. However, other curing agents can be used, such as triazone resins or phenol formaldehyde resins. This reaction causes the shell 415 to form around a droplet of payload 410. Formation of the shell 415 occurs in the absence of actinic radiation (e.g., when the reaction mixture is exposed to electromagnetic radiation at wavelengths above approximately 300 nm). This is discussed in greater detail with respect to FIG. 4B. It should be noted that, for simplicity, FIG. 4A illustrates a small number of molecules 420 and 425, which are not to scale with the payload droplet 410. However, process 400 includes a sufficient quantity of resveratrol dimers 420 and emulsifying agent 425 to form shells around, at least, the majority of payload droplets in the mixture.

In some embodiments, the photodegradable capsules formed in process 400 are microcapsules (e.g., approximately 10 μm-1000 μm in diameter). However, other sizes can be formed as well. The average size of the capsules depends, at least in part, upon the stir speed during the emulsification and capsule formation. For example, finer capsules (e.g., approximately 10 nm-10 μm in diameter) can be formed at higher stir speeds. The size of the capsules also be influenced by other factors, such as temperature and/or reaction components. The capsules are optionally combined with polymer matrices, carrier fluids, and/or additives, and are then deposited onto surfaces as pesticide coatings. This is discussed in greater detail above.

Figure 4B:
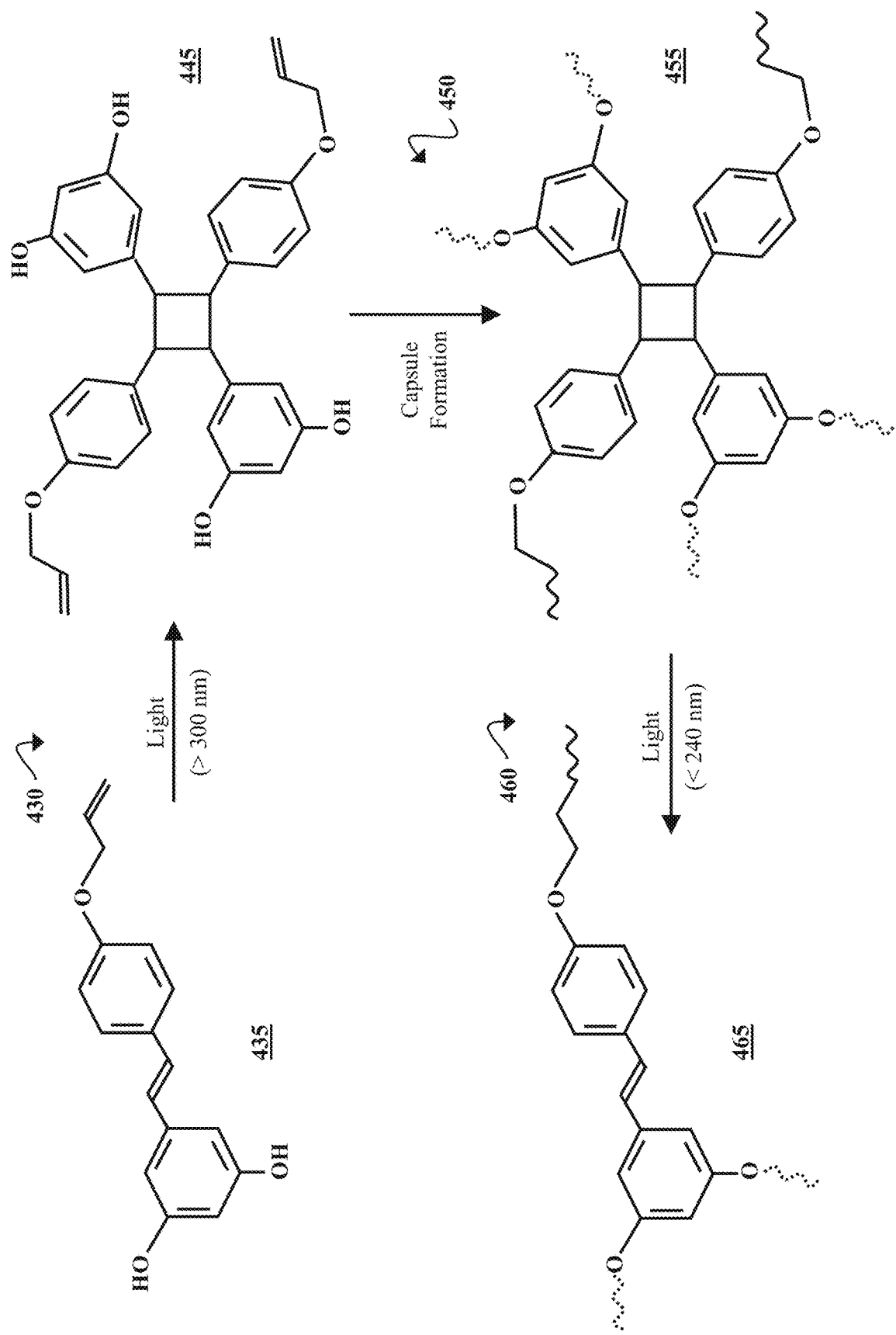

FIG. 4B is a chemical reaction diagram illustrating processes 430, 450, and 460 of forming and decomposing photodegradable capsules, according to some embodiments of the present disclosure. An example of a photodegradable capsule 405 such as these is illustrated in FIG. 4A. In process 430, a resveratrol derivative 435 is dissolved in water ($H_2O$), ethanol (EtOH), or an $H_2O$/EtOH mixture. The resveratrol derivative 435 can be obtained from commercial sources, or it can be synthesized (e.g., by reacting resveratrol with an allyl source, such as an allyl halide, in the presence of triethylamine and tetrahydrofuran at approximately 0° C.). The resveratrol derivative 435 in process 430 has an allyl functional group. However, resveratrol derivatives with other functional groups (e.g., vinyl, meth(acrylate), or epoxy) can be used. Further, the resveratrol derivative 435 can be replaced with non-functionalized resveratrol (3,5,4'-trihydroxy-trans-stilbene) in some embodiments.

The resveratrol derivatives 435 dimerize in the absence of actinic radiation. To accomplish this reaction, the resveratrol derivative 435 solution is exposed to electromagnetic radiation at wavelengths greater than approximately 300 nm (e.g., approximately 290 nm-800 nm). For example, light in the visible (390 nm-700 nm), UV-A (320 nm-400 nm), and/or UV-B (290 nm-320 nm) ranges can be used. Radiation at lower wavelengths (e.g., approximately 240 nm or below) can cause retro-dimerization of the dimer 445, thereby inhibiting the reaction. In the absence of actinic radiation (e.g., approximately 100 nm-240 nm) molecules of the resveratrol derivative 435 form an allyl-functionalized resveratrol dimer 445 (referred to herein as an allyl resveratrol dimer 445). The allyl resveratrol dimer 445 is a photosensitive compound that can form a photodegradable polymer.

In process 450, a photodegradable shell is formed from the allyl resveratrol dimers 445. This includes polymerization of the allyl resveratrol dimers 445. The polymerization occurs in an emulsification process for forming a sustained-released pesticide capsule. This is discussed in greater detail with respect to FIG. 4A. The resulting capsule shell polymer includes a network of connected photosensitive dimer units 455, each provided by an allyl resveratrol dimer molecule 445. The shell can also include other units and/or bound molecules (e.g., resveratrol monomer units, alternate resveratrol-derived dimer units, cross-linkers, additives, etc.). The locations of bonds connecting the photosensitive dimer units 455 of the shell polymer are represented by wavy dotted lines. In this example, the photosensitive dimer units 455 also have orthogonal functionalities provided by the allyl functional groups of the allyl resveratrol dimers 445. The allyl functional groups can bind to a polymer matrix, additive, and/or pesticide. These binding locations are represented by wavy solid lines. It should be noted that, in some embodiments, there are no orthogonal functionalities (e.g., when the allyl resveratrol dimers 445 are replaced by non-functionalized resveratrol dimers).

In process 460, the photosensitive dimer units 455 of the shell polymer are photochemically cleaved in a retro-dimerization reaction. Retro-dimerization occurs when the dimer units 455 are exposed to electromagnetic radiation (e.g., at wavelengths of approximately 240 nm or lower). The retro-dimerization reaction may also be promoted by radiation at wavelengths of up to approximately 290 nm. For example, photodegradable capsules that include the photosensitive units 455 can be exposed to UV-C radiation (100 nm-290 nm). Simultaneous exposure of the photosensitive units 455 to radiation at higher wavelengths (e.g., approximately 250 nm-800 nm) does not prevent the retro-dimerization from occurring. When a capsule having a shell formed from resveratrol dimers is exposed to actinic radiation, photocleavage of the photosensitive units 455 produces a photodegraded polymer that includes resveratrol monomer units 465. Actinic radiation is provided by sunlight or artificial light (e.g., incandescent lamps, fluorescent lamps, or light-emitting diodes). This photodegradation of the polymer allows pesticides to be released from the capsule.

Figure 5:
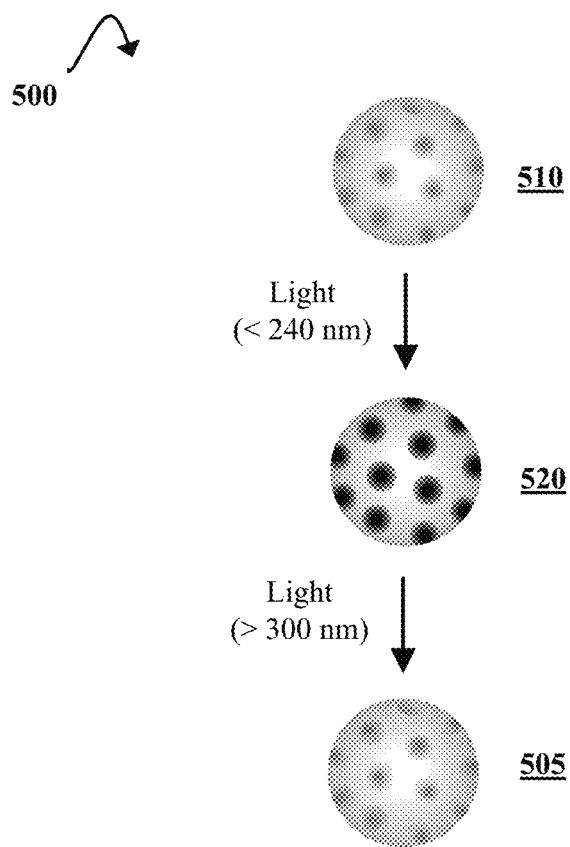
Figure 5:
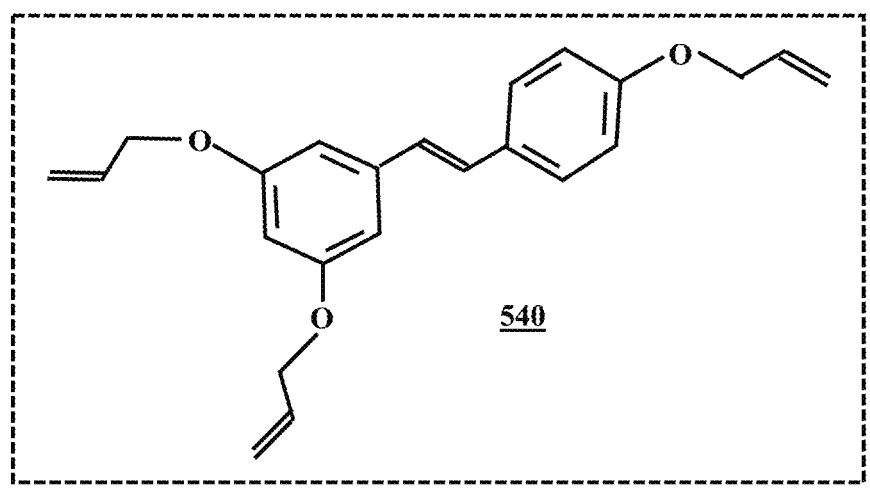

FIG. 5 is a chemical reaction diagram illustrating a process 500 of forming porous sustained-release pesticide capsules 505, according to some embodiments of the present disclosure. These porous capsules 505 provide a second example of pesticide capsules that can be used in process 300, which is illustrated in FIG. 3. Each capsule 505 includes pores containing a pesticide, which are capped by a photosensitive polymer that prevents the pesticide from being released. However, due to the photosensitivity of the capping polymer, the pores are able to open and close in response to electromagnetic radiation at appropriate wavelengths.

Examples of a porous sustained-release pesticide capsule 505, a capped particle 510, and an uncapped particle 520 are illustrated as light gray spheres with dots representing pores. Capped pores are represented by dark gray dots, and uncapped pores are represented by black dots. This is intended to provide a simplified illustration, and it should be understood that the dots and spheres are not to scale, and are not intended to represent the actual appearance or structure of the capsules 505 or particles 510 and 520. In some embodiments, the porous sustained-release capsules 505 are nanocapsules having an average size of approximately 200 nm in diameter, and an average pore size of approximately 2-3 nm in diameter. However, capsules 505 of other sizes (e.g., ranging from approximately 10 nm-1000 μm in diameter) can be formed under appropriate reaction conditions, as would be understood by a person of ordinary skill in the art.

Process 500 begins with the provision of particles 510 having pores that are capped with a photosensitive polymer. The capped particles 510 can be synthesized in situ, or obtained from another source (e.g., a commercial entity or a research institution). In an example of a process (not shown)

of forming the capped particles 510, porous silica nanoparticles are first prepared by dissolving approximately $3\times10^{-3}$ mol n-cetyltrimethylammonium bromide (CTAB) in water (e.g., 500 mL water). Approximately 3-4 mL of an aqueous solution of sodium hydroxide (e.g., approximately 2 M $NaOH_{(aq)}$) is then added to the solution, and the temperature is adjusted to approximately 80° C. Approximately $3\times10^{-2}$ mol tetraethyl orthosilicate (TEOS) is added dropwise to the solution, followed by dropwise addition of approximately $5\times10^{-3}$ mol 3-mercaptopropyltrimethoxysilane (MPTMS). This mixture is then stirred for approximately two hours. The solid product of this reaction is filtered, washed with methanol and deionized water, and dried.

The resulting dried porous silica nanoparticles have surfactant (CTAB) remaining in their pores. Without removing the surfactant, the porous silica nanoparticles are mixed with a vinylsilane, and refluxed for approximately twenty-four hours in ethanol. During this period of refluxing, vinyl-modified porous silica nanoparticles are formed. These particles are washed with ethanol and methanol in order to remove remaining surfactant. The particles are then dried (e.g., at 80° C. in vacuo) in order to remove remaining solvent from their pores. After drying, the vinyl-modified porous silica nanoparticles are reacted in a cross-metathesis reaction with a photosensitive dimerizable stilbenoid compound 540. Though the stilbenoid compound 540 is illustrated as being (E)-1,3-bis(allyloxy)-5-(4-(allyloxy)styryl) benzene, other compounds that are capable of dimerization and retro-dimerization reactions when exposed to actinic radiation are used in some embodiments. Examples of photosensitive dimerizable compounds that may be used can include anthracenes, phenanthrenes, coumarin derivatives, hydroxycinnamate derivatives, alternate stilbenoids, etc. The dimerizable compound 540 forms a polymer in the cross-metathesis reaction. This polymer caps the silica nanoparticle pores, thereby producing the capped particles 510.

Process 500 continues with the reversible opening of the pores in the capped particles 510. The capped particles 510 are exposed to actinic radiation (e.g., electromagnetic radiation at wavelengths of approximately 240 nm or lower) while suspended in water, an organic solvent, and/or a polymer matrix. When the capped particles 510 are exposed to the actinic radiation, retro-dimerization of units in the photosensitive polymer occurs. This opens the pores by breaking bonds in the capping photosensitive polymer, yielding the uncapped particle 520. The capped particles 510 are mixed with payload components before, during, and/or after this exposure. The payload includes a water-soluble pesticide and, optionally, additional components (e.g., water, additives, and/or other solvents).

The pesticide and other optional payload components in the mixture then enter the open pores. This pesticide loading step is followed by a step of closing the pores in the absence of actinic radiation. The mixture containing the pesticide-loaded uncapped particles 520 is exposed to electromagnetic radiation at wavelengths greater than approximately 300 nm (e.g., approximately 290 nm-800 nm). This allows the stilbenoid compound 540 units in the photosensitive polymer to re-dimerize in the absence of actinic radiation, once again capping the pores. Capping the pores yields porous sustained-release pesticide capsules 505. When the porous capsules 505 are exposed to radiation at wavelengths of approximately 240 nm or below, retro-dimerization will again occur, causing the pores to open, and the pesticide to be released. Radiation at these wavelengths can be provided by sunlight, or by artificial lighting.

The porous capsules 505 are optionally incorporated into a polymer matrix, combined with carrier fluids, and/or combined with additives. The capsules 505 are then deposited onto surfaces as pesticide coatings. The porous capsules 505 are not illustrated as having orthogonal functionalities. However, in some embodiments, the porous capsules 505 have orthogonal functionalities that facilitate incorporation of the capsules 505 into a polymer matrix by binding. Additives and/or additional pesticides can also be bound to the orthogonal functionalities. Examples of polymer matrices, additional pesticides, carrier fluids, and additives that can be included in the pesticide coatings along with the porous capsules 505 are discussed in greater detail above.

The processes discussed herein and their accompanying drawings are not to be construed as limiting. One skilled in the art would recognize that a variety of techniques may be used that vary in conditions, components, methods, etc., which ultimately generate sustained-release pesticide materials and coatings. In addition, the conditions can optionally be changed over the course of a process. Further, in some embodiments, processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may produce the pesticides, a second entity may produce the hydrogels or microcapsules, and a third entity may deposit the sustained-release pesticide materials on a surface.

What is claimed is:

1. A sustained-release pesticide coating, comprising:

a pesticide underlayer to be deposited on a surface;

a photodegradable hydrogel layer deposited on the pesticide underlayer, wherein the photodegradable hydrogel layer is formed by reacting 4-armed alkyne-terminated polyethylene glycol (PEG) monomers with 4-armed coumarin azide-terminated PEG monomers, wherein:

each terminal functional group on the 4-armed alkyne-terminated PEG monomers has the formula:

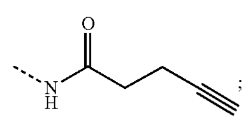

;

and each terminal functional group on the 4-armed coumarin azide-terminated PEG monomers has the formula:

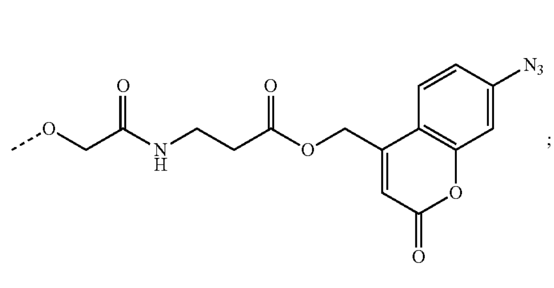

;

and a pesticide overlayer deposited on the photodegradable hydrogel layer, wherein the photodegradable hydrogel layer temporarily prevents contact between the pesticide overlayer and the surface.

2. The sustained-release pesticide coating of claim 1, further comprising at least one material selected from the group consisting of an additional pesticide, a binder, a carrier fluid, and an additive.

3. The sustained-release pesticide coating of claim 2, wherein the additive is selected from the group consisting of a colorant, a corrosion inhibitor, a stabilizer, a hardener, a co-solvent, and a plasticizer.

4. The sustained release pesticide coating of claim 1, wherein the pesticide underlayer comprises a first pesticide directed to a first type of organism and a second pesticide directed to a second type of organism.

5. The sustained release pesticide coating of claim 1, wherein the pesticide underlayer comprises a first pesticide directed to a first type of organism and the pesticide overlayer comprises a second pesticide directed to a second type of organism.

6. The sustained release pesticide coating of claim 1, wherein the photodegradable hydrogel layer is formed in an azide-alkyne cycloaddition reaction.

7. The sustained release pesticide coating of claim 1, wherein the pesticide underlayer comprises at least one pesticide blended with a polymer adhesive binder.

8. The sustained release pesticide coating of claim 1, wherein the pesticide underlayer comprises at least one pesticide blended with an adhesive additive.

9. The sustained release pesticide coating of claim 1, wherein the pesticide overlayer comprises at least one pesticide blended with a polymer adhesive binder.

10. The sustained release pesticide coating of claim 1, wherein the 4-armed alkyne-terminated PEG monomers are formed in a process comprising:
    forming a solution of 4-armed polyethylene glycol amine-HCl and excess triethylamine; and
    adding 4-pentynoic acid, diisopropyl carbodiimide, and diethyl aminopyridine to the solution.

11. The sustained release pesticide coating of claim 1, wherein the 4-armed coumarin-azide PEG monomers are formed in a process comprising:
    forming a solution of 4-armed polyethylene glycol tetra-carboxylic acid and excess N,N-diisopropyl ethylamine;
    forming a mixture of 1-[bis(dimethylamino)methylene]-1H-1,2,3-triazolo[4, 5,-b]pyridinium 3-oxid hexafluorophosphate and the solution; and
    adding a solution of coumarin azide and N,N-diisopropyl ethylamine to the mixture.

12. The sustained release pesticide coating of claim 10, wherein the 4-armed polyethylene glycol amine-HCl has a molecular weight ranging from approximately 300 Da-20,000 Da.

13. The sustained release pesticide coating of claim 11, wherein the 4-armed polyethylene glycol tetra-carboxylic acid has a molecular weight ranging from approximately 300 Da-20,000 Da.

* * * * *